United States Patent [19]

Barrett

[11] Patent Number: 5,661,702

[45] Date of Patent: Aug. 26, 1997

[54] COMPACT DISC VISUAL/AUDIO DISPLAY SYSTEM

[75] Inventor: Henry A. Barrett, Macedon, N.Y.

[73] Assignee: Eastman Kodak Company, Rochester, N.Y.

[21] Appl. No.: 346,557

[22] Filed: Nov. 29, 1994

Related U.S. Application Data

[63] Continuation-in-part of Ser. No. 143,329, Oct. 26, 1993, Pat. No. 5,461,596.

[51] Int. Cl.$^6$ .................................................... G11B 13/00
[52] U.S. Cl. ............................................. 367/14; 386/126
[58] Field of Search .................................. 369/14, 15, 70, 369/69, 58, 52, 32, 275.3; 358/342, 343; 360/19.1, 35.1

[56] References Cited

U.S. PATENT DOCUMENTS

| | | | |
|---|---|---|---|
| 3,654,708 | 4/1972 | Brudner | 434/307 R |
| 4,616,263 | 10/1986 | Eichelberger | 348/722 |
| 4,858,030 | 8/1989 | Oku et al. | 369/50 |
| 4,863,384 | 9/1989 | Slade | 360/12 |
| 4,905,094 | 2/1990 | Pocock et al. | 358/342 |
| 5,027,290 | 6/1991 | Kirk et al. | 395/154 |
| 5,065,345 | 11/1991 | Knowles et al. | 395/154 |
| 5,109,482 | 4/1992 | Bohrman | 395/154 |
| 5,170,388 | 12/1992 | Endoh | 369/14 |
| 5,172,242 | 12/1992 | Yamaguchi et al. | 358/342 |
| 5,243,581 | 9/1993 | Yuji et al. | 369/32 |
| 5,282,187 | 1/1994 | Lee | 359/14 |
| 5,301,172 | 4/1994 | Richards et al. | 369/32 |

*Primary Examiner*—Tan Dinh
*Attorney, Agent, or Firm*—Gunnar Leinberg

[57] ABSTRACT

An apparatus for outputting images and any associated audio stored on a photo compact disc includes a compact disc reader and a control device. The compact disc reader is adapted to have at least two heads which are able to read multiple video and audio tracks on the photo compact discs. The reader has a first video and audio output representative of one image and any associated audio stored of the photo compact disc and has a second video and audio output representative of another image and any associated audio stored on the photo compact disc. The control device has display video and audio outputs and an first/second switch. The first/second switch is coupled between the first and second video and audio outputs and the display video and audio outputs. The control device is operable to control the first/second switch to selectively change the display video output between the images from the first and second video outputs without a noticeable transitional delay in response to the audio on the display audio output. With the system, a viewer will not notice a transitional delay between displayed images and displayed images will always be synchronized with the audio being output.

13 Claims, 13 Drawing Sheets

COMPACT DISC VISUAL/AUDIO DISPLAY SYSTEM

FIELD OF THE INVENTION

This is a continuation-in-part of application Ser. No. 08/143,329 filed Oct. 26, 1993 and now is U.S. Pat. No. 5,461,596. This invention relates generally to a visual/audio display system and more particularly to a photo compact disc visual/audio display system which is able to switch images on a viewing screen without a perceptible delay and is able to synchronize the visual and audio display.

BACKGROUND OF THE INVENTION

A typical visual/audio display system consists of slide projectors, audio cassette decks and a viewing screen or video wall. Images on slides are displayed on the screen or wall in succession by the slide projectors. The slide projectors can change the displayed image without any perceptible delay by a viewer. The cassettes played in the audio cassette decks provide any audio which may accompany the images being displayed. Thus, with this system, a viewer observes a continuous display of changing images and hears accompanying audio, without any distracting transitions between the display of images.

New design challenges with conventional visual/audio systems, such as the one described above, have resulted from the advent of photo CD technology. Basically, photo compact disc (CD) technology has enabled data representing one or more images and audio associated with each image to be stored on a photo CD. To display an image and hear the audio, a photo CD player and a display device are needed. More specifically, when a viewer wishes to see an image stored on a photo CD and hear any associated audio, the photo CD is inserted into a photo CD player. The viewer inputs his selection to the photo CD player which selects the desired image on the disc and reads the stored data. The data is transmitted to the viewing device to display the image and play any associated audio. The image remains on the screen until the viewer inputs his next selection, causing the photo CD player to select the next desired image and to read the stored data on the disc. The data is again transmitted to the viewing device, however before the viewing device can display the next desired image, a delay of approximately three to four seconds is needed to "wipe" the current image from the screen of the display device. To the viewer, "wiping" appears as the replacement of a first image by a second image. More specifically, the second image appears to replace the first image in discrete packets or lines. For example, the replacement appears to go line-by-line from top to bottom, column-by-column or diagonally in either direction. For many applications, this transitional delay is only a minor inconvenience, however with visual/audio systems which might use photo CD technology this delay is particularly problematic.

As noted previously, visual/audio display systems involve the presentation of a series of still images and audio. If photo CD technology was expanded into traditional visual/audio display systems, viewers would be subjected to a repeated delay between each image to be displayed, as the previous image is wiped from the screen or wall. This repeated delay during the change of images would be very distracting to viewers and as a result would detract from the overall visual/audio presentation.

PROBLEM(S) TO BE SOLVED BY THE INVENTION

Accordingly, one problem to be solved is the development of a visual/audio display system which uses photo CD technology and is able to change the image displayed on a viewing screen or video wall without a viewer being able to detect a perceptible delay between program segments.

Additional problems to be solved include the development of a visual/audio display system which uses photo CD technology and:

A. Samples the audio program material from each photo CD player;

B. Determines whether audio is present and if not then disables the change image function of the photo CD player for a fixed duration of time;

C. Determines if audio is of a predetermined length, and if it is not the required length then disable the change image function of the photo CD player for a fixed duration of time; and D. Advances the standby player to the correct image in the program sequence.

SUMMARY OF THE INVENTION

Accordingly, it is a general object of the present invention to provide a photo compact disc visual/audio system.

It is another object of the present invention to provide a visual/audio system for photo compact disc technology which is able to change the image displayed on a viewing screen or video wall without a viewer being able to detect a perceptible delay.

It is yet another object of the present invention to provide a visual/audio system for photo compact disc technology which is able to synchronize the visual and audio presentation.

According to the present invention, these and other objects and advantages are achieved in an apparatus and method for displaying successive images with associated audio stored on a photo compact disc. The apparatus includes first and second photo compact disc players for playing the photo compact disc and a control device. Each photo compact disc player has an output representative of one image and any associated audio stored on the photo compact disc. The control device has a display output and an internal switch coupled to the outputs of the first and second photo compact disc players and to the display output. The control device is able to control the switch to selectively change the display output between the images and any associated audio from the outputs of the first and second photo compact disc players without a noticeable transitional delay. Additionally, the control device is able to queue the first or second photo compact disc player not selected by the control device for connection to the display output to the next image and any associated audio on the photo compact disc for display. The system monitors the audio output by the first and second photo compact disc players and an internal timer to control when the switch is made. With the system, a viewer will not notice a transitional delay between displayed images. Additionally, the visual images will always be synchronized with the audio output.

In an alternative embodiment, another apparatus and method for displaying successive images with any associated audio without a perceptible transitional delay between displayed images includes a compact disc reader and a control device. The compact disc reader is adapted to have at least two heads which are able to read two different video and audio tracks on the photo compact disc. The reader has a first video and audio output representative of one image and any associated audio stored on the photo compact disc and has a second video and audio output representative of another image and any associated audio stored on the photo compact disc. The control device has display video and audio outputs and an CD reader switch. The first/second switch is coupled between the first and second video and audio outputs and the display video and audio outputs. The control device is operable to control the first/second switch to selectively change the display video output between the images from the first and second video outputs without a noticeable transitional delay in response to the audio on the display audio output. The control device may also include an internal timer and is operable to control the CD reader switch in response to the audio being output and the duration of the timer. With the system, a viewer will not notice a transitional delay between displayed images and displayed images will always be synchronized with the audio being output.

ADVANTAGEOUS EFFECT(S) OF THE INVENTION

With an apparatus or method in accordance with the present invention, the image displayed in a photo CD visual/audio display system can be changed without a perceptible transitional delay and with the displayed image and audio synchronized.

Accordingly with this apparatus or method, a viewer will not be able to detect any perceptible delay between images displayed on the screen or by differences between the displayed image and the associated audio.

DETAILED DESCRIPTION OF THE INVENTION

Figure 1A:
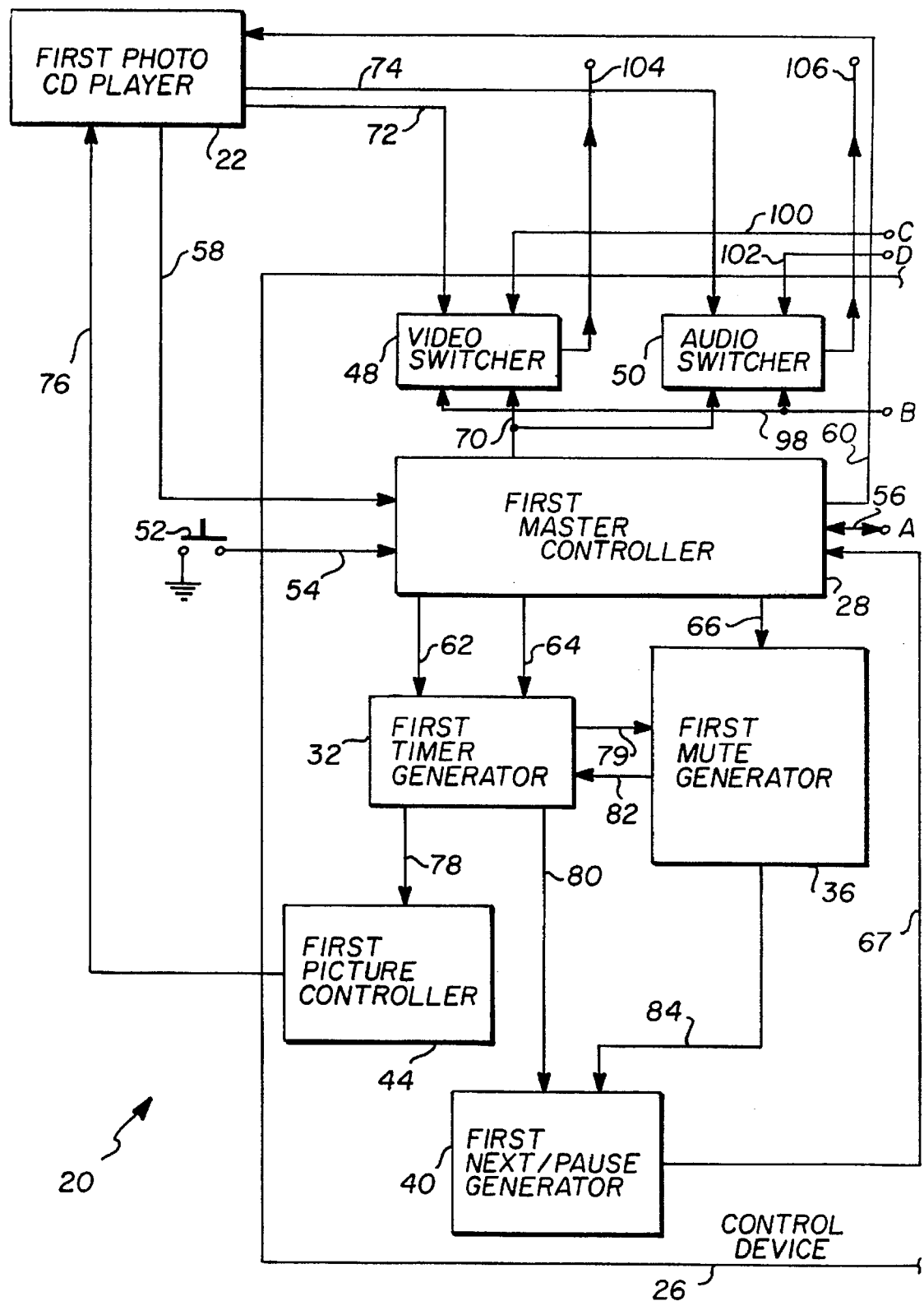
FIG. 1(a) is a block diagram of a portion of a portfolio photo compact disc visual/audio control system in accordance with the present invention.

A photo compact disc visual/audio control system 20 in accordance with one embodiment of the present invention is illustrated in FIGS. 1(a-b). Basically, the system 20 includes a first and second photo compact disc (CD) players 22 and 24 and a control device 26. The control device 26 includes a first and second master controller 28 and 30, a first and second timer generator 32 and 34, a first and second mute generator 36 and 38, a first and second next/pause generator 40 and 42, a first and second picture controller 44 and 46, a video switcher 48 and an audio switcher 50. With the present invention, images displayed by the portfolio CD visual/audio system 20 can be changed by the system 20 without a perceptible transitional delay by a viewer and also with the visual images synchronous with the audio being output. As a result, a fluid visual and audio presentation is provided with photo CD technology.

The invention is disclosed as being embodied preferably in a visual/audio system 20 such as Kodak's PCD-870. Because the features of a visual/audio system are generally known, the description which follows is directed in particular only to those elements forming part of or cooperating directly with the disclosed embodiment. For example, clock signals on some of the flip-flops in the drawings are not illustrated because their location and operation in the system would be well-known and a matter of design choice to someone skilled in the art. Additionally, the control device 26 could include a manual override switch or control (not shown) which would allow outside control over when the displayed image is changed. Accordingly, it is to be understood that other elements may take various forms known to a person of ordinary skill in the art.

Referring to FIGS. 1(a-b), the first master controller 28 performs several functions for the control device 26, including generating output signals for controlling the first player 22, the video and audio switchers 48 and 50, the first timer generator 32, the first mute generator 36 and the second master controller 30. More specifically, the first master controller 28 is controlled by signals from the start button 52 via line 54, the first player 22 via line 58, the first next/pause generator via line 67 and the second master controller via line 56. The signal on line 54 indicates when the start button 52 has been pressed and the signal on line 58 indicates whether there is any audio with the image being displayed. Line 67 provides a signal from the first next/pause generator 40 which indicates when the first master controller 28 should queue the first player 22 to the next image and another signal which indicates when the first master controller 28 should pause the first player 22. Finally, when the first player 22 has been paused and the second player 24 has been playing, the signal on line 56 from the second master controller 30 indicates when the first master controller 28 may start up again to display the next image from the first player 22.

The first master controller 28 includes suitable logic and timing circuitry for generating the output signals for controlling the first player 22, the video and audio switchers 48 and 50, the first timer generator 32, the first mute generator 36 and the second master controller 30. More specifically, the first master controller 28 controls the first player 22 by generating an output signal on line 60 for pausing, unpausing or stopping the operation of the first player 22 and controls the video and audio switchers 48 and 50 by generating an output signal on line 70 which indicates if the image and audio queued to the first video and audio switchers 48 and 50 from the first player 22 are selected.

The first master controller 28 also generates control signals for controlling the first timer generator 32 on lines 62 and 64, the first mute generator 36 on line 66 and the second master controller 30 on line 56. The signal on line 62 indicates when an internal timer (not shown) in the first timer generator 32 should be started. The purpose of the internal timer is to provide the minimum display time for the each photo CD image. The timer should have a duration longer then the amount of time need to wipe a second or new image over a first or old image on a display device. Presently, approximately 3.5 seconds is needed to wipe a second or new image over a first or old image on a viewing screen or video wall. Accordingly, in this particular embodiment a five second timer is used to provide sufficient time to wipe and then queue a subsequent image. The signal output on line 64 indicates if any audio has been detected with the displayed image by the first master controller 28 before an internal timer (not shown) in the first master controller 28 has expired. The internal timer in the first master controller 28 has a shorter duration then the internal timer in the first timer generator 32. In this particular embodiment, a two second timer is used, although timers of other durations could be used if desired. The first master controller 28 monitors its internal timer in conjunction with the signal on line 58 which indicates if there is any audio with the displayed image to generate the Signal on line 64 if there is no audio present. Finally, the signal on line 56 indicates that the second master controller 30 should begin generating output signals for selecting the image and audio queued from the second player 24 for display.

The first photo CD player 22 is designed to read selected video and audio signals from a photo CD (not shown) inserted into the player 22. The first player 22 is controlled by output signals from the first master controller 28 via line 60 and by the first picture controller 44 via line 76. Line 60 includes a signal which can pause, unpause or stop the player 22 and line 76 includes a signal which can disable the first player 22 from changing the video and audio signals being read. In this particular embodiment, line 76 is coupled to the NIRQ line (not shown) in the first player 22 to prevent the image from changing. As noted earlier, the first player 22 outputs a signal to the first master controller 28, via line 58, which indicates if any audio is present with the image to be displayed. The first player 22 also outputs video and audio signals read from the photo CD to the video and audio switchers 48 and 50, via lines 72 and 74 respectively. Each switcher 48 and 50 receives the respective video and audio outputs of the first and second photo CD players 22 and 24 and selectively connects the outputs of one of the players 22 and 24 to the video display output 104 and the audio display output 106.

The first timer generator 32 is designed to generate an output signal to initiate a change in the displayed image after an internal timer has expired, only if either no audio accompanies the image being displayed or if the audio with the image stops before the internal timer expires. As noted earlier, a five second timer is used in this particular embodiment, although timers of other durations could be used if desired. More specifically, the first timer generator 32 is controlled by signals from the first master controller 28 via lines 62 and 64 and by the first mute generator 36 via line 82. As discussed earlier, the signal on line 62 starts the internal timer in the first timer generator 32 and the signal on line 64 indicates when audio has not been detected with the displayed image by the first master controller 28. On line 82, the signal indicates when audio with the displayed image stops before the internal timer in the first timer generator 32 has expired. The first timer generator 32 has suitable logic and timing circuitry for transmitting a signal out to the first picture controller 44 via line 78 and out to the first mute pulse generator via line 79 for the duration of the timer. The first timer generator 32 also has suitable circuitry for monitoring its own internal timer and the signals on lines 64 and 82. If the signal on line 64 indicates either there is no audio with the displayed image or the signal on line 82 indicates that the audio with the displayed image has stopped before the internal timer has expired, then the first timer generator 32 generates a signal to the first next/pause generator 40 to indicate that a change in the displayed image is needed via line 80 when the internal timer has expired.

The first mute generator 36 is designed to generate signal to initiate a change in the displayed image when the audio with the displayed image stops, only if the audio stops after the internal timer in the first timer pulse generator 32 has expired. The first mute generator 36 is controlled by signals from the first master controller 28 via line 66 and the first timer generator 32 via line 79. Line 66 carries the signal from the first player 22 which indicates if there is any audio present with the image being displayed. Line 79 transmits the timer signal which indicates when the internal timer in the first timer generator is running. The first mute generator 36 has suitable logic and timing circuitry for generating a signal on line 82 which indicates that audio has stopped during the duration of the timer in the first timer generator 32 and for generating a signal on line 84 which indicates that the audio has stopped after the timer in the first timer generator 32 has expired.

The first next/pause generator 40 is designed to generate the next signal and then the pause signal for switching the first player 22 to the next image and then pausing the first player 22 when a change from the image being displayed by the first player is desired. The first next/pause generator 40 is controlled by signals from the first timer generator 32 via line 80 and the first mute generator 36 via line 84. The signal on line 80 indicates that either no audio was detected with the displayed image or the audio with the displayed image stopped during the duration of the timer in the first timer generator 32 and the timer in the first timer generator 32 has now expired. The signal on line 84 indicates that the audio with the displayed image stopped after the timer in the first timer generator 32 has expired. The first next/pause generator 40 includes suitable logic and timing circuitry to monitor lines 80 and 84 and to generate the signals on line 67 to initiate the change of the displayed image. When either the signal on line 80 or line 84 is received, the first next/pause generator 40 generates a next signal to the first master controller 28 to advance the first player to the next image and then generates a pause signal to the first master controller 28 to pause the first player 22.

The first picture controller 44 is designed to disable the first player 22 from changing the displayed image. The first picture controller 44 is controlled by the timer signal on line 78 from the first timer generator 32 and in response to the timer signal disables the first player 22 from changing images during the duration of the timer in the first timer generator 32. The first picture controller 44 may control the disabling of the first player 22 with a FET switch (not shown).

Figure 1B:
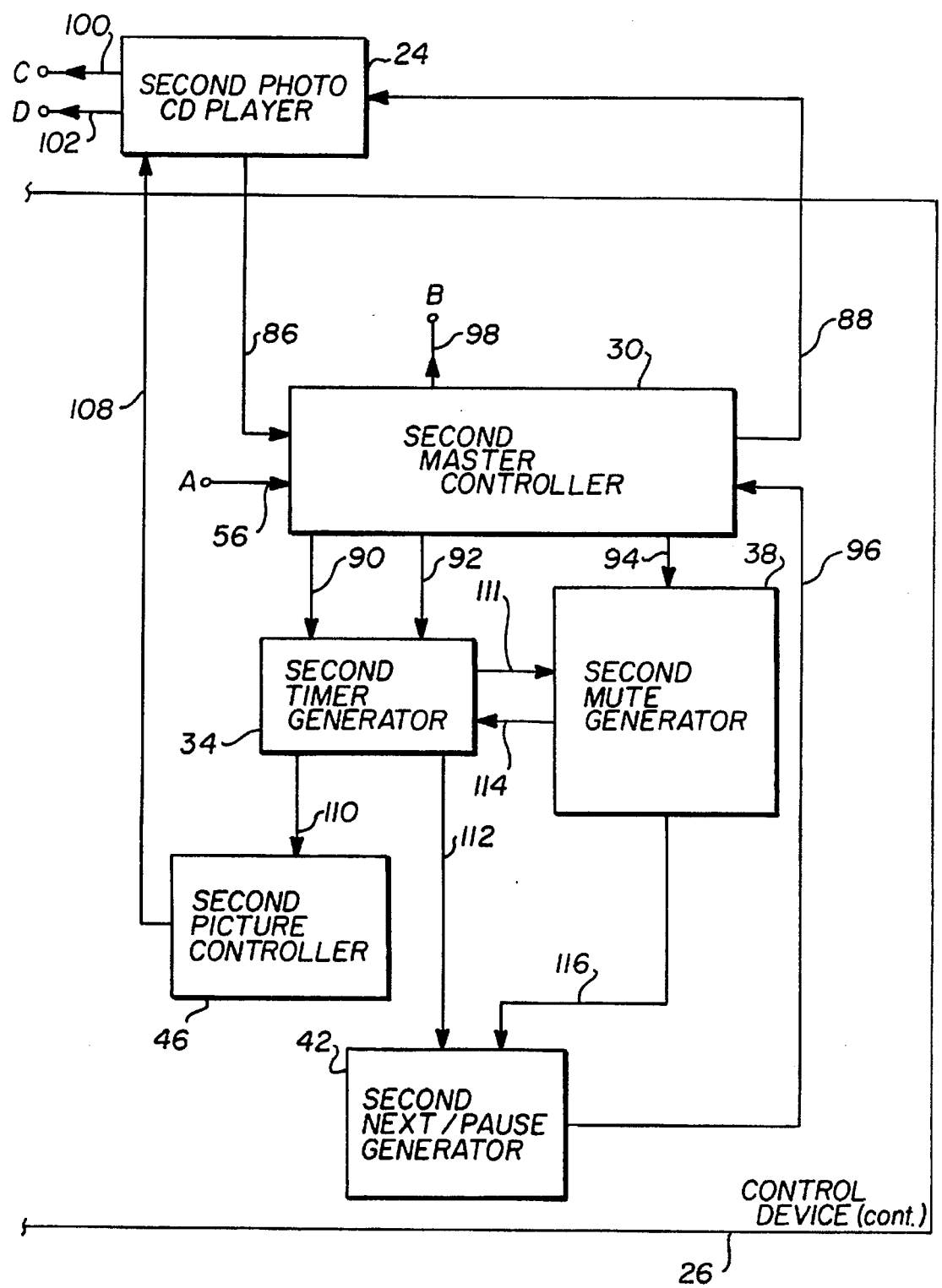
FIG. 1(b) is a block diagram of the remaining portion of the visual/audio control system of FIG. 1(a)

The portion of the control device 26 illustrated primarily in FIG. 1(b) is substantially identical to that for the portion illustrated primarily in FIG. 1(a), however for clarity the connections will be discussed below. Like the first master controller 28, the second master controller 30 also performs several functions for the control device 26, including generating output signals for controlling the second player 24, the video and audio switchers 48 and 50, the second timer generator 34, the second mute generator 38 and the first master controller 28. More specifically, the second master controller 30 is controlled by signals from the first master controller 28 via line 56, the second player 24 via line 86, and the second next/pause generator via line 96. The signal on line 56 indicates when the start button 52 has been pressed or when the image from the second player 24 is desired and the signal on line 86 indicates whether there is any audio with the image being displayed. Line 96 provides a signal from the first next/pause generator 42 which indicates when the second master controller 30 should queue the second player 24 to the next image and another signal which indicates when the second master controller 30 should pause the second player 24.

The second master controller 30 includes suitable logic and timing circuitry for generating the output signals for controlling the second player 24, the video and audio switchers 48 and 50, the second timer generator 34, the second mute generator 38 and the first master controller 28. More specifically, the second master controller 30 controls the second player 24 by generating an output signal for pausing, unpausing or stopping the operation of the second player 24 on line 88 and controls the video and audio switchers 48 and 50 by generating an output signal on line 98 which indicates if the image and audio queued to the first video and audio switchers 48 and 50 from the second player 24 is selected.

The second master controller 30 also generates control signals for controlling the second timer generator 34 on lines 90 and 92, the second mute generator 38 on line 94 and the first master controller 28 on line 56. The signal on line 90 indicates when an internal timer (not shown) in the second timer generator 34 should be started. The purpose of the internal timer is to provide the minimum display time for the each photo CD image. The timer should have a duration longer then the amount of time need to wipe a second or new image over a first or old image on a display device. Presently, approximately 3.5 seconds is needed to wipe a second or new image over a first or old image on a viewing screen or video wall. Accordingly, in this particular embodiment a five second timer is used to provide sufficient time to wipe the image. The signal output on line 92 indicates if any audio has been detected with the displayed image by the second master controller 30 before an internal timer (not shown) in the second master controller 30 has expired. The internal timer in the second master controller 30 has a shorter duration then the internal timer in the second timer generator 34. In this particular embodiment, a two second timer is used, although timers of other durations could be used if desired. The second master controller 30 monitors its internal timer in conjunction with the signal on line 86 which indicates if there is any audio with the displayed image to generate the signal on line 92 if there is no audio present. Finally, the signal on line 56 indicates that the first master controller 28 should begin generating output signals for selecting the image and audio queued from the first player 22 for display.

The second photo CD player 24 is designed to read selected video and audio signals from a photo CD (not shown) inserted into the player 24. The second player 24 is controlled by output signals from the second master controller 30 via line 88 and by the second picture controller 46 via line 108. Line 88 includes a signal which can pause, unpause or stop the second player 24 and line 108 includes a signal which can disable the second player 24 from changing the video and audio signals being read. In this particular embodiment, line 108 is coupled to the NIRQ line (not shown) in the second player 24 to prevent the image from changing. As noted earlier, the second player 24 outputs a signal to the second master controller 30, via line 86, which indicates if any audio is present with the image to be displayed. The second player 24 also outputs video and audio signals read from the photo CD to the video and audio switchers 48 and 50, via lines 100 and 102 respectively. Each switcher 48 and 50 receives the respective video and audio outputs of the first and second photo CD players 22 and 24 and selectively connects the outputs of one of the players 22 and 24 to the video display output 104 and the audio display output 106.

The second timer generator 34 is designed to generate an output signal to initiate a change in the displayed image after an internal timer has expired, only if either no audio accompanies the image being displayed or if the audio with the image stops before the internal timer expires. As noted earlier, a five second timer is used in this particular embodiment, although timers Of other durations could be used if desired. More specifically, the second timer generator 34 is controlled by signals from the second master controller 30 via lines 90 and 92 and by the second mute generator 38 via line 114. As discussed earlier, the signal on line 90 starts the internal timer in the second timer generator 34 and the signal on line 92 indicates when audio has not been detected with the displayed image by the second master controller 30. On line 114, the signal indicates when audio with the displayed image stops before the internal timer in the second timer generator 34 has expired. The second timer generator 34 has suitable logic and timing circuitry for transmitting a signal out to the second picture controller 46 via line 110 and out to the second mute pulse generator via line 111 for the duration of the timer. The second timer generator 34 also has suitable circuitry for monitoring its own internal timer and the signals on lines 92 and 114. If either the signal on line 92 indicates there is no audio with the displayed image or the signal on line 114 indicates that the audio with the displayed image has stopped before the internal timer has expired, then the second timer generator 34 generates a signal to the second next/pause generator 42 to indicate that a change in the displayed image is needed via line 112 when the internal timer has expired.

The second mute generator 38 is designed to generate a signal to initiate a change in the displayed image when the audio with the displayed image stops, only if the audio stops after the internal timer in the second timer pulse generator 34 has expired. The second mute generator 38 is controlled by signals from the second master controller 30 via line 94 and the second timer generator 34 via line 111. Line 94 carries the signal from the second player 24 which indicates if there is any audio present with the image being displayed. Line 111 transmits the timer signal which indicates when the internal timer in the second timer generator 34 is running. The second mute generator 38 has suitable logic and timing circuitry for generating a signal on line 114 which indicates that audio has stopped during the duration of the timer in the second timer generator 34 and for generating a signal on line 116 which indicates that the audio has stopped after the timer in the second timer generator 34 has expired.

The second next/pause generator 42 is designed to generate the next signal and then the pause signal for switching the second player 24 to the next image and then pausing the second player 24 when a change from the image being displayed by the second player 24 is desired. The second next/pause generator 42 is controlled by signals from the second timer generator 34 via line 112 and the second mute generator 38 via line 116. The signal on line 112 indicates that either no audio was detected with the displayed image or the audio with the displayed image stopped during the duration of the timer in the second timer generator 34 and the timer in the second timer generator 34 has now expired. The signal on line 116 indicates that the audio with the displayed image stopped after the timer in the second timer generator 34 has expired. The second next/pause generator 42 includes suitable logic and timing circuitry to monitor lines 112 and 116 and to generate the signals on line 96 to initiate the change of the displayed image. When either the signal on line 112 or line 116 is received, the second next/pause generator 42 generates a next signal to the second master controller 30 to advance the second player 24 to the next image and then generates a pause signal to the second master controller 30 to pause the second player 24.

The second picture controller 46 is designed to disable the second player 24 from changing the displayed image. The second picture controller 46 is controlled by the timer signal on line 110 from the second timer generator 34 and in response to the timer signal disables the second player 24 from changing images during the duration of the timer in the second timer generator 34. The second picture controller 46 may control the disabling of the second player 24 with a FET switch (not shown).

The operation of the portfolio photo compact disc video/audio system will now be described with reference to FIGS. 1(a–b). Initially, the first and second players 22 and 24 are loaded with a photo compact disc (not shown) which has stored on it a number of images and associated audio information. When the start button 52 of the control device 26 is pressed, a start signal is transmitted along the line 54 to the first master controller 28 causing at least four different operations to begin.

Upon receipt of the start signal, the first master controller 28 transmits an unpause signal to the first player 22 on the line 60. The unpause signal causes the first player 22 to unpause and transmit video and audio signals for an image and any associated audio stored on the photo CD to the video and audio switchers 48 and 50 lines 72 and 74 and then out to the display device (not shown). It also causes the first photo CD player 22 to transmit a signal via line 58 to the first master controller 28 which indicates, if any audio is present.

The start signal also causes the first master controller 28 to begin an internal two second timer and to transmit a signal to enable the timer in the first timer generator 32 via line 62. The first timer generator 32 transmits a timer signal to the first picture controller 44 and to the first mute generator 36 via lines 78 and 79 for the duration of the timer. When the first picture controller 44 receives the timer signal, it transmits a disable signal to the first player 22 via line 76 to prevent the image being displayed by the first player 22 from changing for the duration of the timer signal.

Meanwhile, the first master controller 28 monitors the signal on line 58 and its internal timer. If audio is not detected on line 58 during the duration of the timer then the first master controller 28 transmits a signal via line 64 to the first timer generator 32 which indicates that there is no audio with the image being displayed. The first master controller 28 also passes the signal on line 58 through to line 66.

The start signal also causes the first master controller 28 to transmit a signal to the second master controller 30 via line 56 to queue to the next image. In response to this signal, the second master controller 30 transmits an unpause signal, a next signal, and then a pause signal in sequence to the second player 24 via line 88. Accordingly, the second player 24 is unpaused, queued to the next image on the photo CD after the one being displayed by the first player 22 and then paused again.

The first mute generator 36 monitors line 66 and line 79. If the signal on line 66, which indicates if there audio is with the displayed image, stops during the duration of the signal on line 79, which is the timer signal from the first timer generator 32, then a signal is transmitted to the first timer generator 32 via line 82. If the signal on line 66 stops after the signal on line 79 has expired, then a signal is transmitted to the first next/pause generator 40 via fine 84.

The first timer generator 32 monitors the signals on 64 and line 82 and its own internal timer. If a signal on either line 64 or 82 is received, then after the timer expires the first timer generator 32 transmits a signal to the first next/pause generator 40 via line 80.

The first next/pause generator 40 monitors lines 80 and 84. When the first next/pause generator 40 receives a signal on either lines 80 or 84, it initiates a next signal and then a pause signal via line 67 to change the displayed image.

The first master controller 28 monitors line 67 and when it receives a next signal, it transmits a signal via line 56. When the signal is received by the second master controller 30, the second player 24 is unpaused and the next image displayed is the image from the second player 24 with any associated audio. The signal also causes the first player 22 to queue to the next image after the one being displayed by the second player 24. When the pause signal is received, the first player 22 is paused.

When the second player 24 is unpaused the above described operations for displaying the next image described above for the portion of the control device 26 illustrated primarily in FIG. 1(a) is initiated for the portion illustrated primarily in FIG. 1(b). Since the operation for the portion of the control device 26 illustrated primarily in FIG. 1(b) is substantially identical to that for the portion illustrated primarily in FIG. 1(a) and previously described above, the operations will not be repeated here again. The operations in the first portion will begin again when the second next/pause generator 42 transmits a signal via line 96 to the second master controller 30 indicating that a change in displayed images is needed. The second master controller 30 will then transmit a signal to the first master controller 28 via line 56 to begin the operation on the FIG. 1(a) portion again.

Figure 2A:
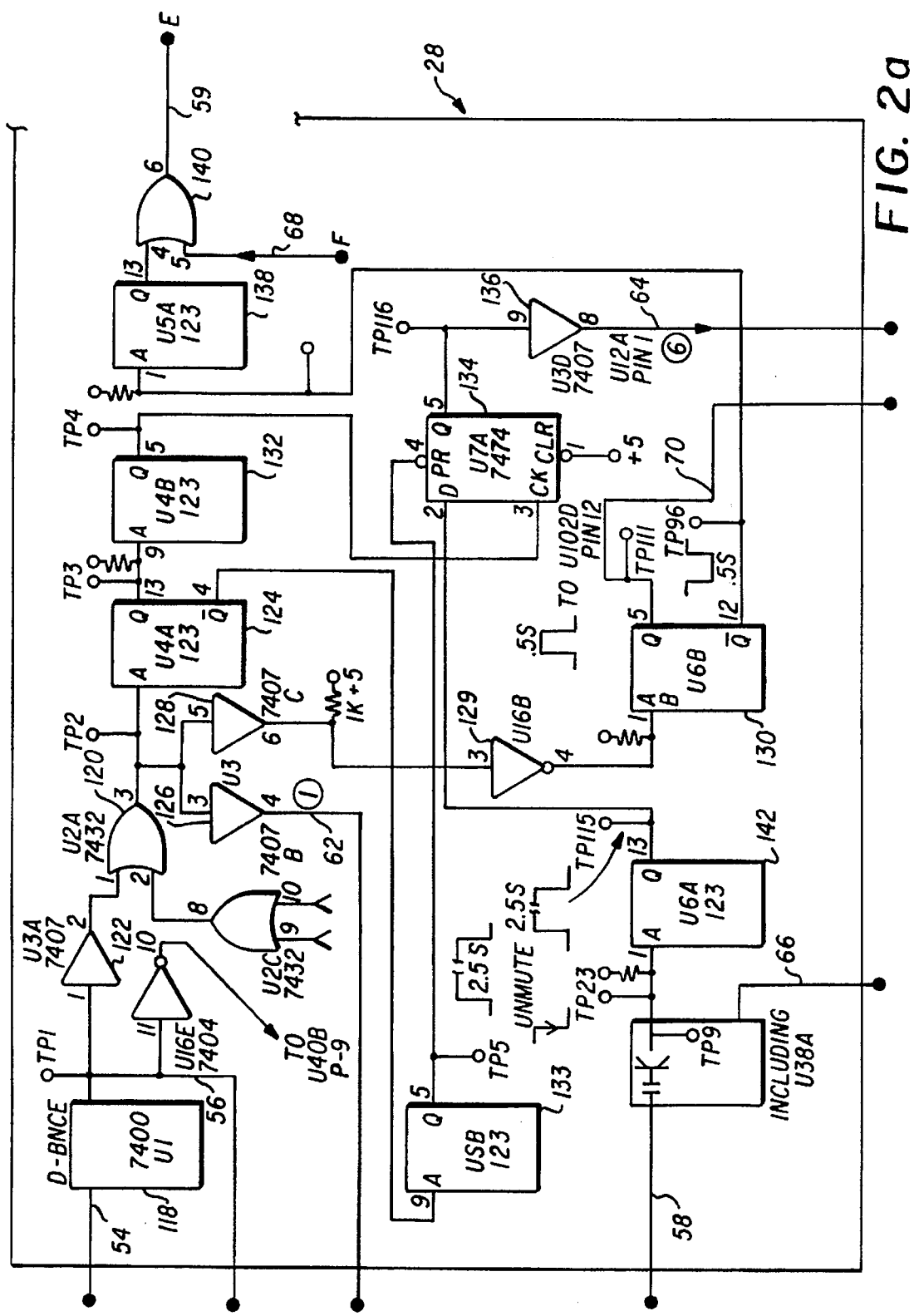
FIG. 2(a) is a block diagram of a portion of a first master controller.

In FIG. 2(a), a more detailed block diagram of a portion of the first master controller 28 is illustrated. The start button 52 is coupled to a set-reset (SR) latch 118. In this particular embodiment, an SN7400 debouncer is used for the SR-latch 118. The SR-latch's output is coupled to three locations. The SR-latch's output is coupled to the second master controller 30 via line 56 to generate the unpause, next and pause sequence and also to the input of a buffer 122 whose output is coupled to an input of an OR gate 120. The output of the OR gate 120 is coupled to a buffer 126 whose output is coupled to line 62. The output of the OR gate 120 is also coupled to a buffer 128 whose output is coupled to the input of a buffer 129 whose output is coupled to the A input of a flip-flop 130 and to the A input of a flip-flop 124. In this particular embodiment, a 7407 buffer is used for the buffers, although other types of buffers could be used. The Q output of the flip-flop 124 is coupled to the A input of another flip-flop 132 and the Q' output of the flip-flop 124 is coupled to the A input of another flip-flop 133. The Q output of the flip-flop 132 is coupled to the clock input, CLK, of a D-flip-flop 134 and the Q output of the flip-flop 133 is coupled to the preset input, PR, of the D-flip-flop 134. The Q output from the D-flip-flop 134 is passed through a buffer 136 and then out to line 64. The Q output 0f the flip-flop 130 is coupled to line 70 and the Q' output is coupled to the A input of a flip-flop 138. The Q output of the flip-flop 138 is coupled to one input of an OR gate 140. The other input to the OR gate 140 is coupled to line 68. The output of the OR gate 140 is coupled to line 59. Line 58 from the first photo. CD player 22 is coupled to line 66 and is also coupled to the A input of a flip-flop 142. The Q output of the flip-flop 142 is coupled to the D input of the D-flip-flop 134. As discussed earlier, the Q output of the D-flip-flop 134 is passed through the buffer 136 and out to line 64.

Figure 2B:
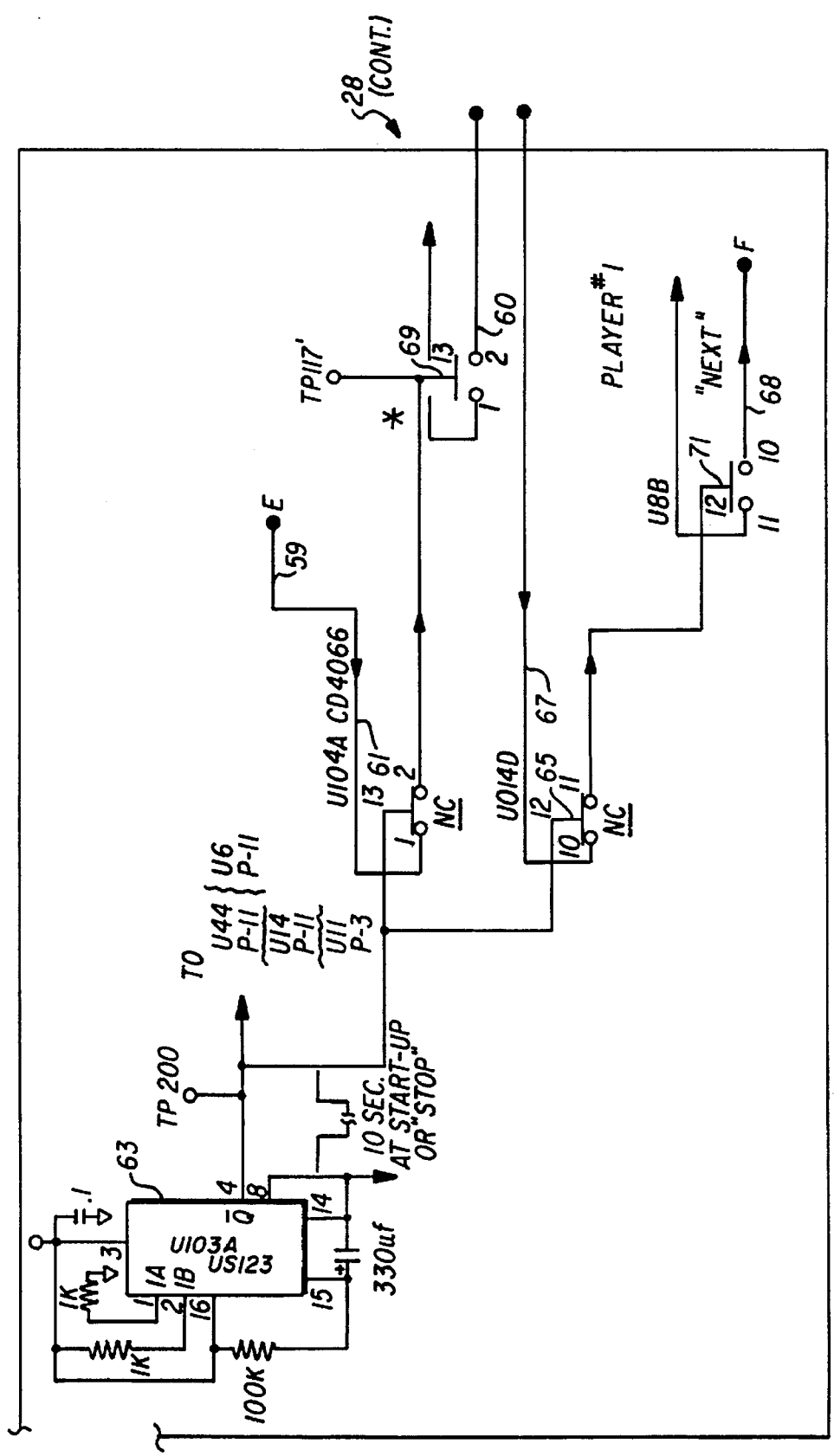
FIG. 2(b) is a block diagram of the remaining portion of the first master controller.

In FIG. 2(b) the remaining portion of the first master controller 28 is illustrated. Line 59 is coupled to one end of a switch 61 and the other end of the switch 61 is coupled to another switch 69 which is coupled to line 60. Line 67 is coupled to one end of a switch 65 and the other end of switch 65 is coupled to another switch 71 which is coupled to line 68. The Q' output of a flip-flop 63 is coupled to the switches 61 and 65 and controls the operation of the switches 61 and 65. In this particular embodiment a FET switch is used for switches 61, 65, 69 and 71, although other types of switches could be used. When a signal is received on either line 59 or 67 then the respective switch 61 65 is opened with the flip-flop 63 for a period of time and then is closed. When switch 61 or 67 opens then switches 69 and 71, respectively close generating a signal on lines 60 and 68. In this particular embodiment the switch is opened for ten Seconds, although other time durations could be used. Since the second master controller 30 has a substantially similar construction to the first master controller 28, the particular connections will not be described in detail here again.

Figure 3A:
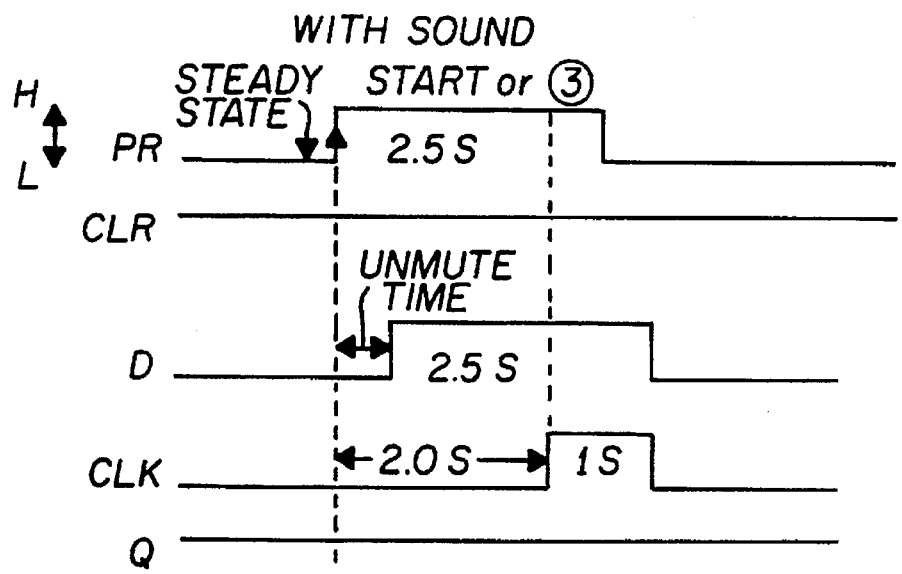
FIG. 3(a) is a timing diagram for the first master controller.
Figure 3B:
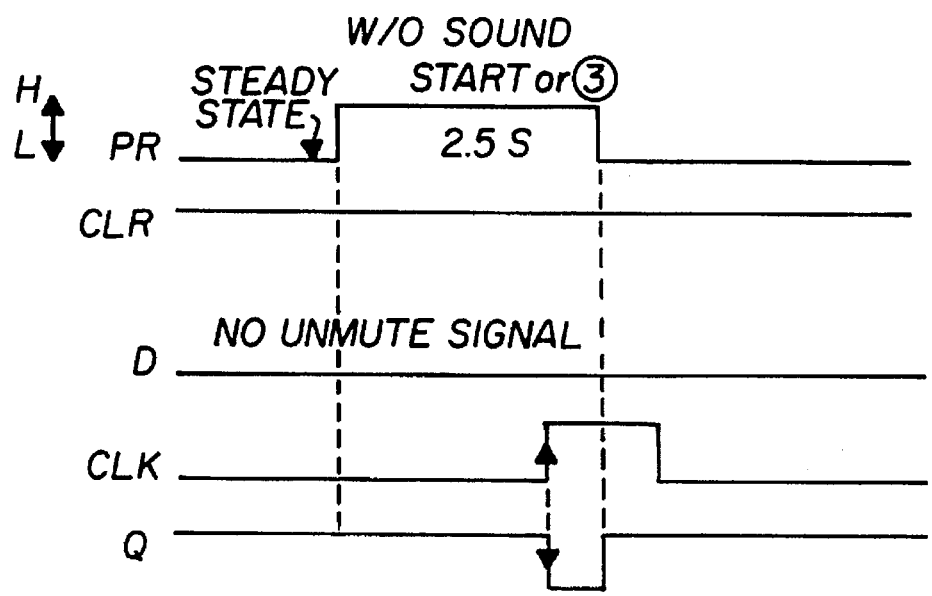
FIG. 3(b) is another timing diagram for the first master controller.

The operation of the first master controller 28 will now be explained in greater detail, with references to FIGS. 3(a–b) to illustrate the operation of the no-sound detection portion of the controller 28. When the start button 52 is pressed, line 54 goes high and then low when released generating a signal on line 54 which indicates to the SR-latch 118 to start the system. In response to this signal, the SR-latch 118 outputs a signal on line 56 to signal the second master controller 30 to queue to the next image and also outputs a signal to the clock input, CLK, and a preset input, PR, for the D-flip-flop 134 through two pairs of flip-flops 124 and 132, and 124 and 133, included for timing purposes. The SR latch 118 also outputs a signal through a pair of flip-flops 130 and 138 to one of the inputs for the OR gate 140 and through a flip-flop 130 and out to line 70. The signal output to line 70 indicates to the video and audio switchers 48 and 50 to select the video and audio signals from the first player 22. When the signal, which is high, from the flip-flop 138 reaches one input of the OR gate 140, the output of the OR gate 140 goes high generating a signal on line 59. The signal on line 59 opens up switch 61 and closes switch 69 which generates a signal on line 60. The signal output on line 60 unpauses the first player 22 which outputs video and audio signals to the video and audio switchers 48 and 50 for the image to be displayed and any associated audio to be played. The other input to the OR gate is the signal on line 68, which indicates if the first next/pause generator is signalling a need to change the displayed image. The signal on line 68 is generated from the signal on line 67. The signal on line 67 goes high when a change in image is needed. When line 67 goes high then switch 65 is opened and switch 71 is closed generating a signal on line 68. The signal on line 68 causes the output of the OR gate 140 to go high again and generates a signal on line 59 and then to line 60, as explained above, to pause the first player 22. The first master controller 28 also receives a signal on line 58, which indicates if there is any audio with the displayed image, and transmits the signal to the A input of the flip-flop 142 which outputs the signal to the D input of the D-flip-flop 134 and to line 66 to the first mute generator 36. If there is audio present with the displayed image, then the signal on line 58 goes low, otherwise the signal remains high. Referring to FIG. 3(a), if the signal, shown on the D line from line 58, goes high during the two second timer, then the Q output of the D-flip-flop remains high, as shown on the Q line, and a signal on line 64 is not generated, indicating audio is present. Referring to FIG. 3(b), if the signal, shown on the D line, remains low during the two second timer, then the Q output of the D flip-flop is driven low and then high, as shown on the Q line, generating a signal on line 64, indicating audio is not present. The second master controller 30 has a substantially similar operation to the first master controller 28 and therefore the operation will not be described here again.

Figure 4:
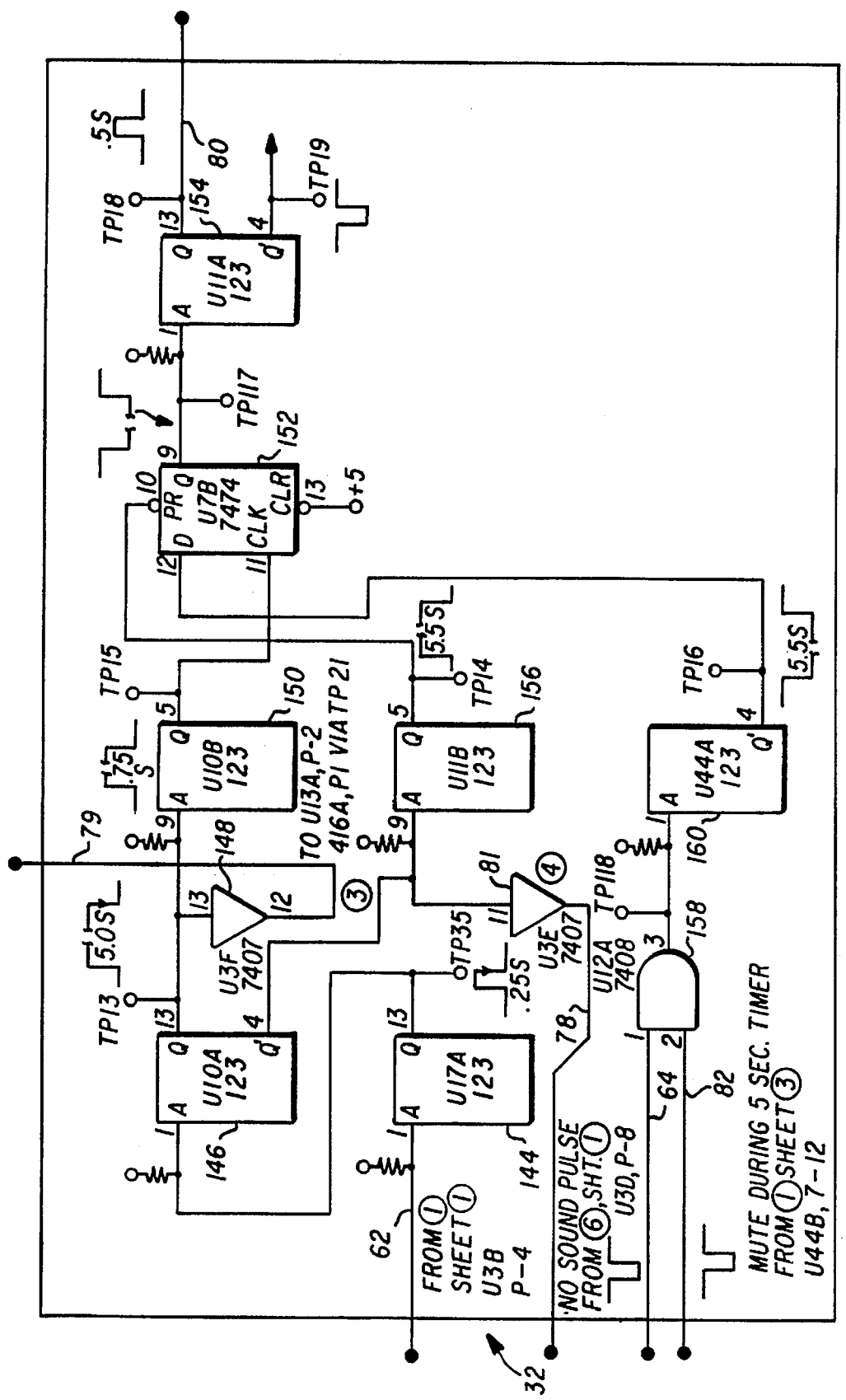
FIG. 4 is a block diagram of a first timer generator.

In FIG. 4, a more detailed block diagram of the first timer generator 32 is illustrated. Line 62 is coupled to the A input of a flip-flop 144 whose Q output is coupled to an A input of another flip-flop 146. The Q output of the flip-flop 146 is coupled through a buffer 148 to line 79. The Q output of the flip-flop 146 is also coupled to the A input of another flip-flop 150 whose Q output is coupled to the clock input, CLK, of a D-flip-flop 152. The Q output of the D-flip-flop 152 is coupled to the A input of a flip-flop 154 whose Q output is coupled to line 80. The Q' output of the flip-flop 146 is coupled to the A input of a flip-flop 156 whose Q output is coupled to the preset input, PR, of the D-flip-flop 152. The Q' output of the flip-flop 146 is also coupled to the input of a buffer 81 whose output is coupled to line 78. Line 64 and line 82 are coupled to an AND gate 158. Lines 64 and 82 are normally held high. The output of the AND gate 158 is coupled to the A input of a flip-flop 160 whose Q' output is coupled to the D input of the D-flip-flop 152. Since the second timer generator 34 has a similar construction to the first timer generator 32, the particular connection will not be described again.

Figure 5A:
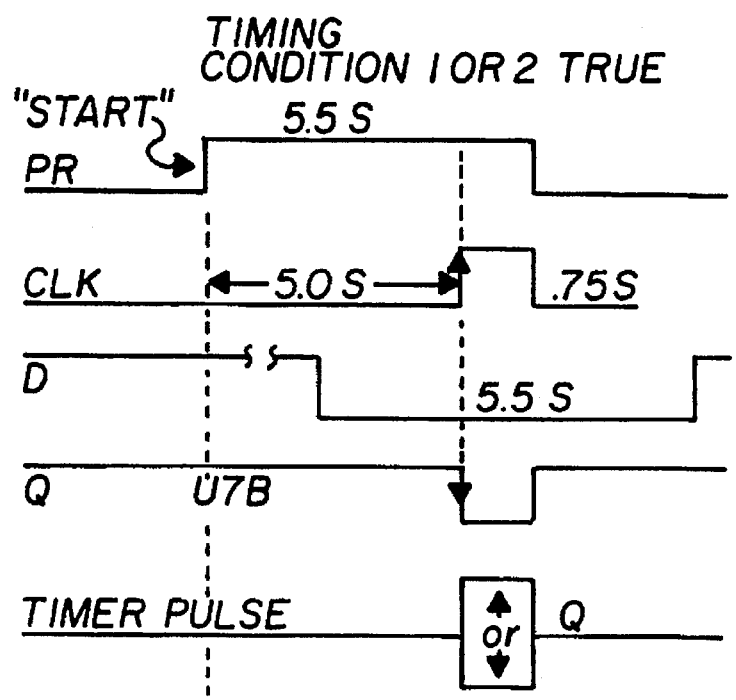
FIG. 5(a) is a timing diagram for the first timer generator.
Figure 5B:
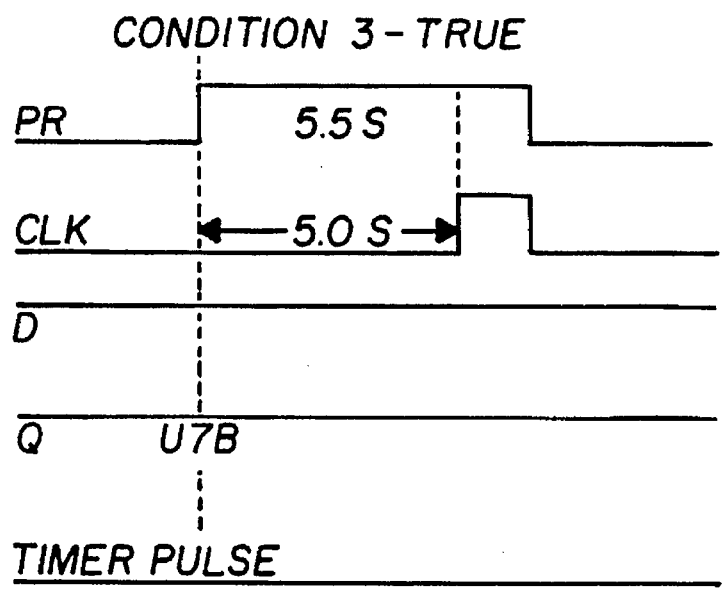
FIG. 5(b) is another timing diagram for the first timer generator.

The operation of the first timer generator 32 will now be explained in greater detail, including references to FIGS. 5(a–b) which are used to further illustrate when the signal on line 80 is generated indicating that a change in the displayed image is needed. The signal on line 62, which indicates that the timer in the first timer generator 32 is to be started, is input through a pair of flip-flops 144 and 146 and causes a signal to be output to the first mute generator 34 via line 79 and to the first change controller 44 via line 78 for the duration of the timer. The signal is also passed through another flip-flop 150 and then to the clock input, CLK, of the D-flip-flop 152. The first change picture controller 44 disables the first player 22 from changing images during the duration of the signal on line 78. Lines 64 and 82 are normally held high. When either goes low because of a signal on line 64 or 82, indicating that either there is no audio with the displayed image or the audio stopped during the timer then the output of the AND gate 158 goes low. The D input of the D-flip-flop 152 is responsive to changes in the output of the AND gate 158 through flip-flop 160. Referring to FIG. 5(a), when the D input from the AND gate 158 goes low, as shown on line D, any time during the timer signal then the Q output of flip-flop 152, shown on line Q, is driven low and then high. When the Q output goes low and then high, the flip-flop 154 coupled to this Q output creates the signal on line 80, shown on the timer line which indicates that a change in the displayed image is needed. Referring to FIG. 5(b), if neither line 64 nor line 82 goes low during the timer signal, then D input remains high, as shown on line D, and no signal is generated on the Q line, line 80, for the first next/pause generator 40. Since the second timer generator 34 has a similar operation to the first timer generator 32, the particular operation will not be described again.

Figure 6:
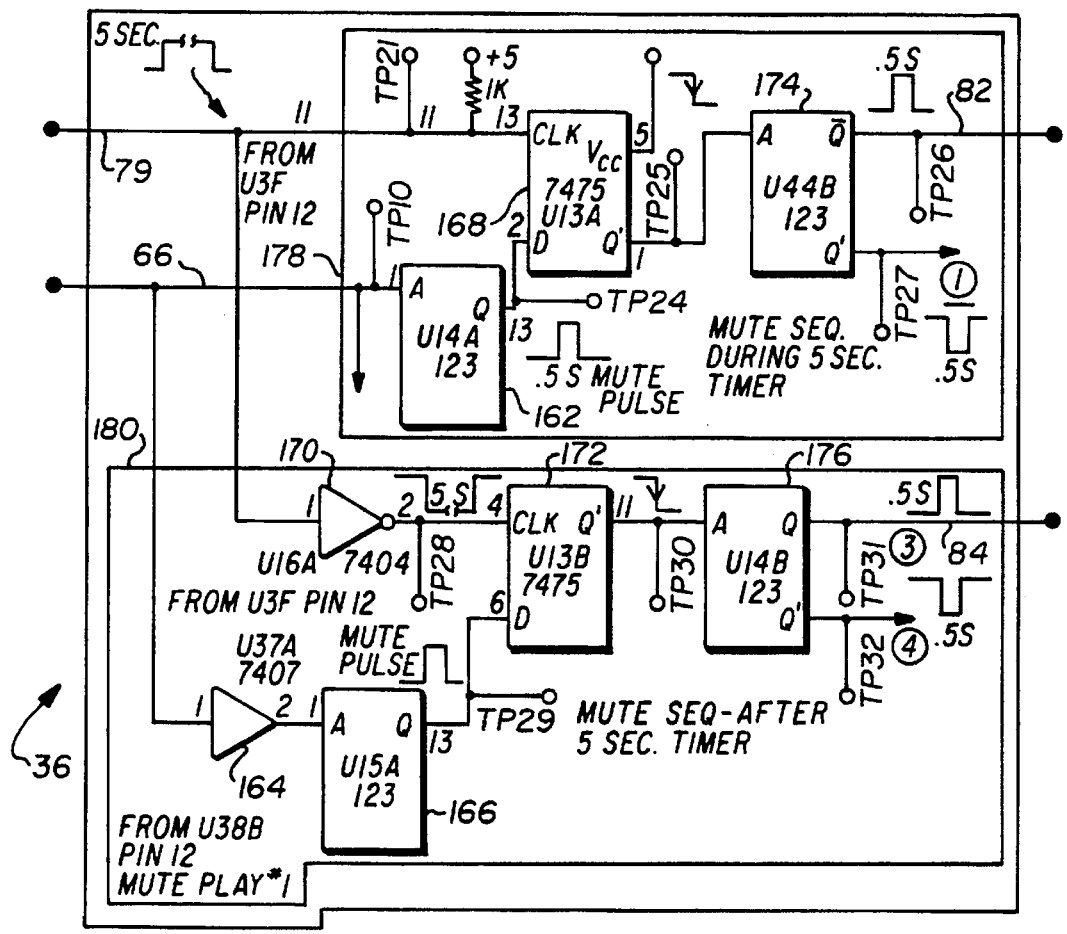
FIG. 6 is a block diagram of a first mute generator.

Referring to FIG. 6, a more detailed block diagram of the first mute generator 36 is illustrated. Line 66 is coupled to an A input of a flip-flop 162 and to an invertor 164 whose output is coupled to an A input of a flip-flop 166. Line 79 is coupled to the clock input, CLK, of a D-flip-flop 168 and to an invertor 170 whose output is fed to a clock input, CLK, in another D-flip-flop 172. The Q' output of the D-flip-flop 168 is output to the A input of a flip-flop 174 whose Q output is coupled to line 82. The second D-flip-flop 172 has a Q' output which is coupled to an A input of a flip-flop 176 whose Q output is coupled to line 84. Since the second mute generator 38 has a similar construction to the first mute generator 36 the particular connections will not be described in detail here again.

Figure 7A:
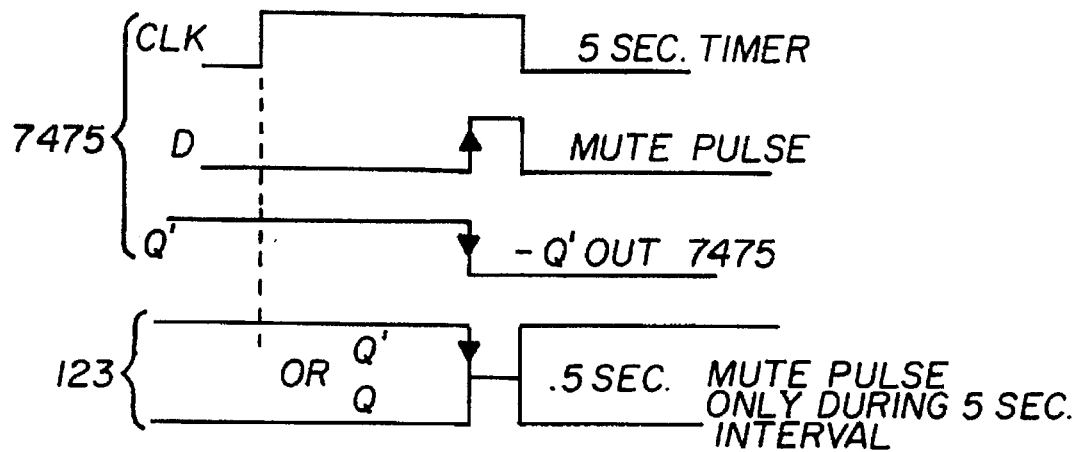
FIG. 7(a) is a timing diagram for the first mute generator.
Figure 7B:
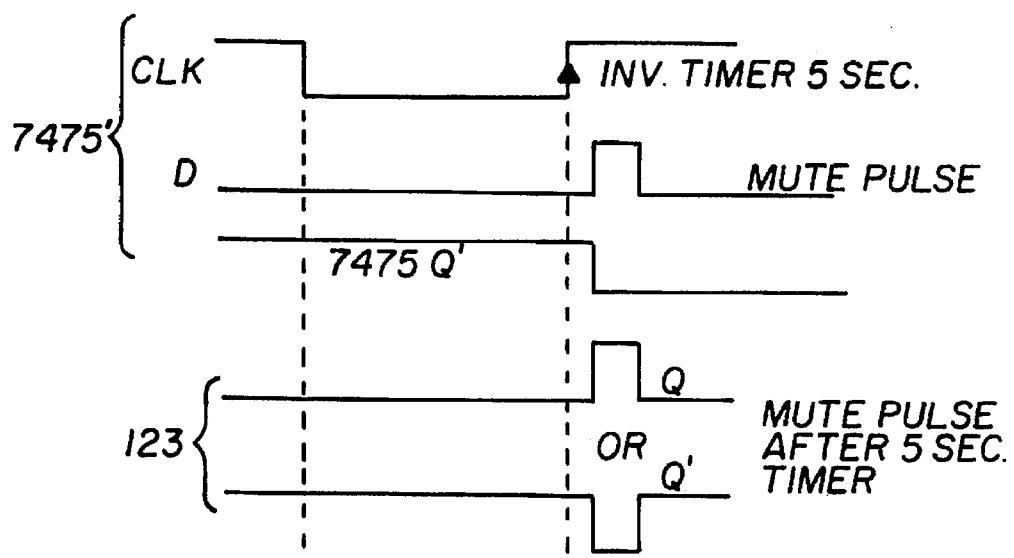
FIG. 7(b) is another timing diagram for the first mute generator.

The operation of the first mute generator 36 will be explained in greater detail with some references to FIGS. 7(a–b). The signal on line 66, which indicates if there is any audio with the displayed image, is transmitted to two circuits in the first mute generator 36, a mute-during-timer circuit 178 and a mute-after-timer circuit 180. The signal transmitted to the mute-after-timer circuit 180 on line 66 is inverted by invertor 164. The signal on line 79, which goes high for the duration of the timer in the first timer generator 32, is also transmitted to both circuits and is also inverted by invertor 170 before it is transmitted to the mute-after-five-second-timer circuit 180. The signal on line 79 is used as the clock signal for both D-flip-flops 168 and 172 in the circuits. Referring to FIG. 7(a), the clock signal, shown on the CLK line, goes high during the five-second-timer signal. If the D input of the D-flip-flop 168, shown on the D line, goes high during the duration of the timer in the first timer generator 32 then the Q' output of the D-flip-flop 168 is driven low, as shown on the Q' line, and generates a signal through flip-flop 174 on line 82 for the first timer generator 32, Which indicates that the audio stopped before the timer expired. Referring to FIG. 7(b), the clock signal, shown on the CLK line, is low during the duration of the timer in the first timer generator 32 and goes high when the timer has expired. If the D input of the D-flip-flop 172, shown on line D, goes high after the timer has expired then the Q' output of the D-flip-flop 172, as shown on the Q' line, is driven low generating a signal through flip-flop 176 on line 84 for the first next/pause generator 40, which indicates that the audio stopped after the timer expired. Since the second mute generator 38 has a similar operation to; the first mute generator 36 the particular operation will not be described in detail here again.

Figure 8A:
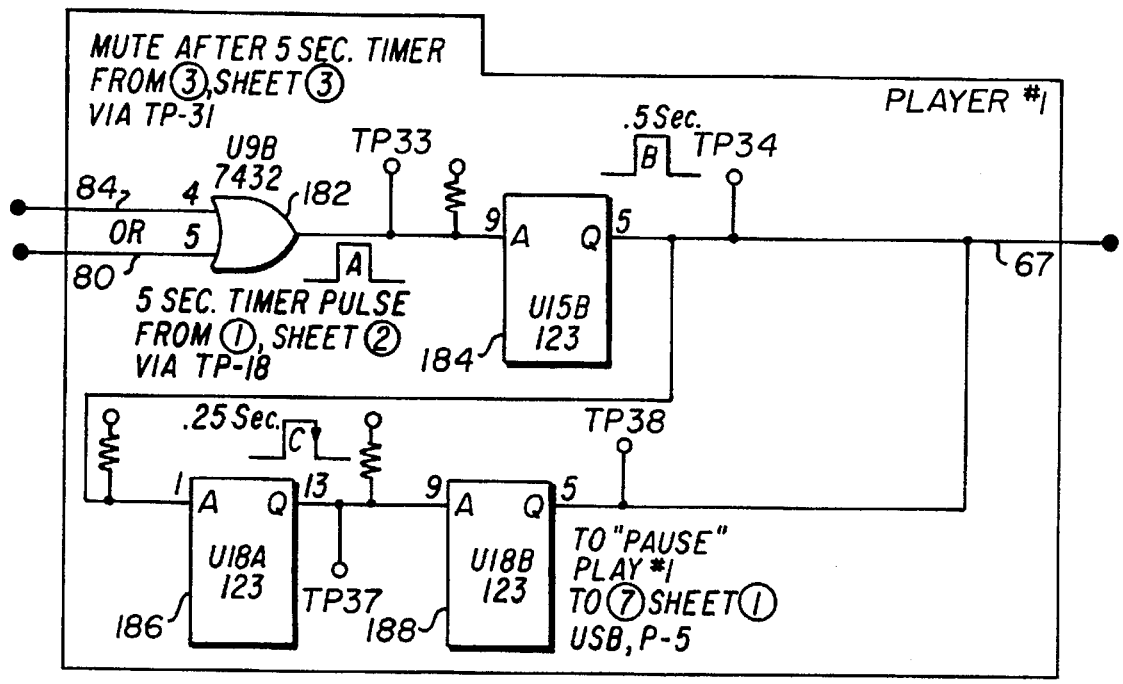
FIG. 8(a) is a block diagram of a first next/pause generator.

Referring to FIG. 8(a) a more detailed block diagram of the first next/pause generator is illustrated. Lines 80 and 84 are coupled to the inputs of an OR gate 182 whose output is coupled to the A input of a flip-flop 184. The Q output of the a flip-flop 184 is coupled to line 67 and also to the A input of another flip-flop 186. The Q output of the A-flip-flop 186 is coupled to the A input of another flip-flop 188 whose Q output is coupled to line 67. Since the second next/pause generator 42 has a similar construction to the first next/pause generator 40, the particular connections will not be described here again in detail.

Figure 8B:
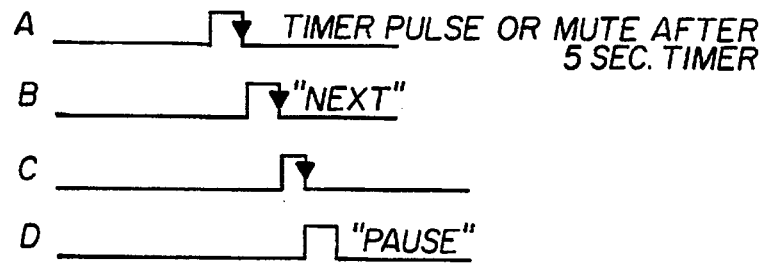
FIG. 8(b) is a timing diagram for the first next/pause generator.

The operation of the first next/pause generator 40 will now be described in greater detail with particular reference to FIG. 8(b). When either a signal from lines 80 or 84, indicating that a change in the displayed image is needed is received, it is transmitted to the OR gate 182. Referring to FIG. 8(b), when either signal is received, as shown by the pulse in line A, then the output of the OR gate 182 goes high. This signal is transmitted through the flip-flop 184 which outputs a signal out to line 67, as shown in line B, which indicates that the first player 22 should be queued to the next image and any associated audio. The output of the flip-flop 184 is also passed through another flip-flop 186 to generate the internal timing delay shown in line C. This delay signal is passed through another flip-flop 188 which outputs the signal, shown in line D, for line 67, which indicates that the first player 22 should now be paused. Since the second next/pause generator 42 has a similar operation to the first next/pause generator 40, the particular operation will not be described here again in detail.

Figure 9:
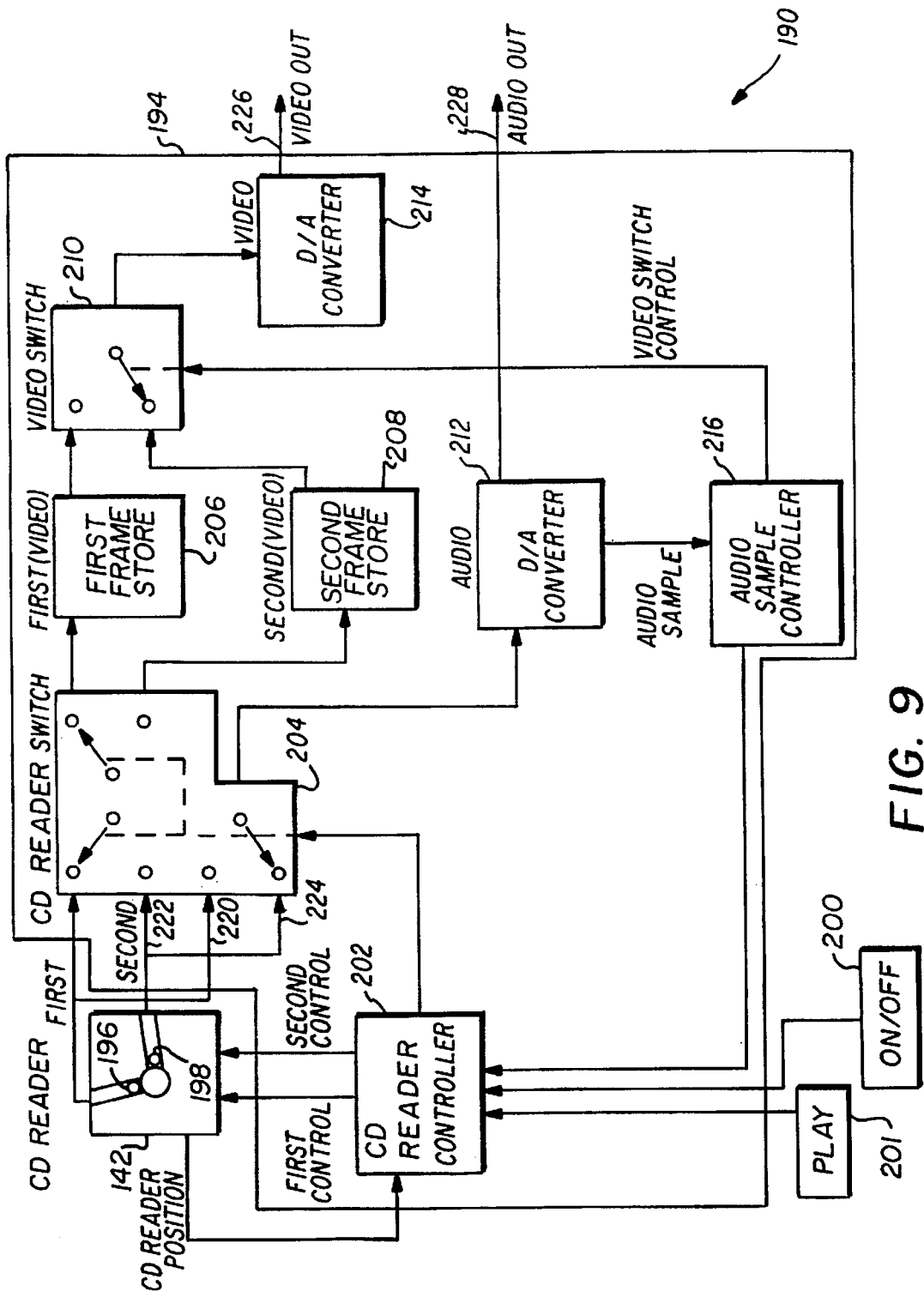
FIG. 9 is a block diagram of another embodiment of a compact disc visual/audio display system in accordance With the present invention.

Referring to FIG. 9, a block diagram of another embodiment of a compact disc visual/audio display system 190 in accordance with the present invention is illustrated. The system includes a compact disc (CD) reader 192 and a control device 194. The CD reader has at least first and second heads 196 and 198 which are adapted to read one compact disc (not shown). The control device 194 includes an on/off switch 200, a play switch 201, a CD reader controller 202, a CD reader switch 204, a first frame store 206, a second frame store 208, a video switch 210, an audio digital-to-analog (D/A) converter 212, a video D/A converter 214, and an audio sample controller 216. Control device 194 controls the CD reader 192 in response to the audio being output with each image so that images can be displayed in succession without a noticeable transitional delay. The control device 194 shown in FIG. 9 is identical to the control device 26 shown in FIGS. 1(a–b), except as described below.

On/off switch 200 and play switch 201 are coupled to CD reader controller 202 in control device 194. On/off switch 200 turns system 190 on and off and play switch 201 puts system 190 in play mode. CD reader controller 202 is coupled to CD reader 192 and transmits control signals to first and second heads 196 and 198 and receives signals from reader 192 which indicate the position of the first and second heads 196 and 198. CD reader controller 202 controls the positioning of first and second heads 196 and 198 in CD reader 192 on the different tracks on the compact discs. CD reader controller 202 is also coupled to CD reader switch 204 and controls when CD reader switch 204 changes connections.

CD reader 192 has at least first and second heads 196 and 198 which are adapted to read the compact disc. The first and second video and audio signals read by first and second heads 196 and 198 are output from CD reader 192 through first video and audio outputs 218 and 220 and second video and audio outputs 222 and 224, respectively. CD reader 192 transmits information back to CD reader controller 202 to indicate the position of first and second heads 196 and 198 on the compact disc.

CD reader switch 204 is coupled to first video and audio outputs 218 and 220, second video and audio outputs 222 and 224, first frame store 206, second frame store 208, and audio D/A converter 212. CD reader switch 204 is adapted to connect either first video output 218 to first frame store 206 and second audio output 224 to audio D/A converter 212 (as shown in FIG. 9) or second video output 222 to second frame store 208 and first audio output 220 to audio D/A converter 212. The first and second video signals read by first and second heads 196 and 198 in CD reader 192 are passed through CD reader switch 204 to be stored in first and second frames stores 206 and 208 when connected by CD reader switch 204. Although not shown, system 190 could include first and second audio stores to store the audio signals associated with the images in first and second frame stores 206 and 208.

Video switch 210 is coupled between first and second frame stores 206 and 208 and video D/A converter 214.

Video switch 210 connects first or second frame store 206 or 208 which is not connected by CD reader switch 204 to CD reader 192 to video D/A converter 214. The video and audio D/A converters 214 and 212 are coupled to display video and audio outputs 226 and 228 for control device 194 and each converter 214 and 212 changes the digital video and audio signals to analog formats before being output from control device 194 through display video and audio outputs 226 and 228.

Audio sample controller 216 is coupled to audio D/A converter 212, CD reader controller 202, and video switch 210. Audio sample controller 216 receives the first or second audio signal which is being output out of the display audio output 228 from audio D/A converter 212. In this particular embodiment, audio sample controller 216 is constructed and operates the same as first master controller 28, first timer generator 32, first mute generator 36, first picture controller 44, and first next/pause generator 40 as shown in FIG. 1(a) except as described below. Audio sample controller 216 controls the operation of CD reader controller 202 and video switch 210 in response to the audio being output and also in response to at least one internal timer. The internal timer is set to run for a period of time greater then the amount of time needed for the next image to be stored in first or second frame store 206 or 208 for display. In this embodiment, about 3.5 seconds is needed to load the next image in either first or second frame store 206 or 208, so the timer is set for about 5 seconds. The particular length of time for the internal timer can vary as needed and desired. The system 190 monitors both the audio being output and the internal timer and changes the image being displayed after the later of the audio stopping or timer expiring. As a result, the change will always be made without a noticeable transitional delay.

Figure 10A:
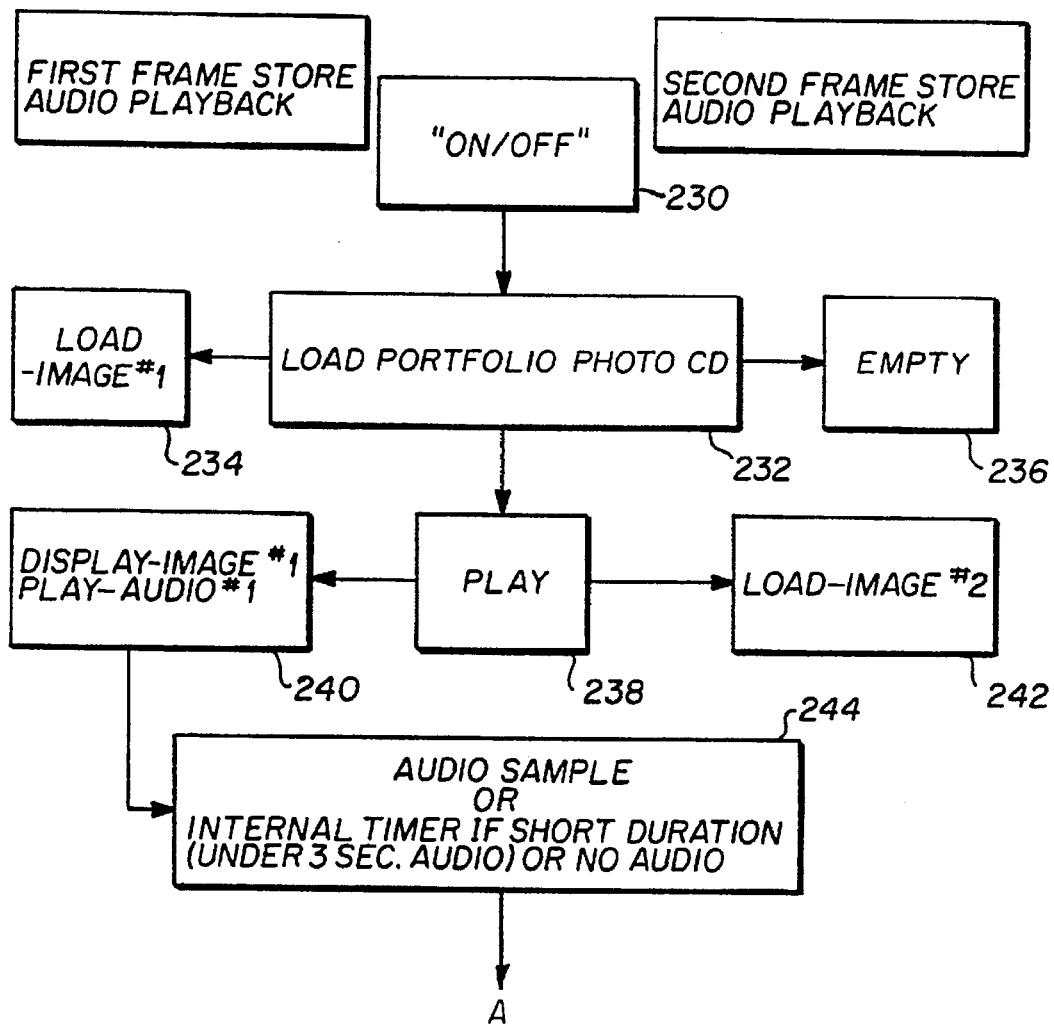
FIG. 10(a) is a flow chart illustrating the operation of the system shown in FIG. 9.

The operation of the alternative embodiment for the compact disc visual/audio display system 190 is discussed below with reference to FIG. 9 and to the flow charts in FIGS. 10(a–b). To start the system, CD reader 192 is loaded with a compact disc. When on/off switch 200 is turned on, on/off switch 200 transmits an on signal to CD reader controller 202. (Step 230).

CD reader controller 202 transmits a signal to CD reader 192 to have first head 196 read the first video signals for the first image from the photo compact disc. (Step 232). Second head 198 in CD reader 192 remains on standby. First and second heads 196 and 198 in CD reader 192 can read the tracks for each image on the compact discs sequentially or can be programmed to read tracks on the compact disc in any order desired. Throughout the operation of the system CD reader 192 will periodically transmits information back to CD reader controller 202 on the position of first and second heads 196 and 198.

CD reader controller 202 also transmits a signal to CD reader switch 204 to connect first video output 218 to first video frame store 206 and second audio output 224 to audio D/A converter 212. The first video signals are transmitted from first video output 218 through CD reader switch 204 and are stored in first frame store 206. (Step 234). Second frame store 208 is empty at this time. (Step 236). Since second head 198 has not been engaged, there are no second audio signals being transmitted from second audio output 224 through CD reader switch 204 to audio D/A converter 212.

Once the first video image is stored, play mode is initiated when play switch 201 is turned on. (Step 238). CD reader controller 202 signals first head 196 to read the first audio signals from the compact disc and signals second head 198 to read the second video signals for the second image from the compact disc. (Step 240).

CD reader controller 202 also signals CD reader switch 204 to change connections and to connect second video output 222 to second frame store 208, disconnecting first video output 218 from first frame store 206, and to connect first audio output 220 to audio D/A converter 212, disconnecting second audio output 224 from audio D/A converter 212. (Step 242). Video switch 210 is set to connect first frame store 206 to video D/A converter 214. Audio and video D/A converters 212 and 214 convert the digital first video and audio signals to analog first video and audio signals and transmit them to the display video and audio outputs 226 and 228, respectively.

The audio signals being output by audio A/D converter 212 are sampled by audio sample controller 216. (Step 244). As noted earlier, the operation of audio sample controller 216 is the same as the first master controller 28, the first timer generator 32, the first mute generator 36, the first picture controller 44, and the first next/pause generator 40 as shown in FIG. 1(a) except as described below. The audio signal from audio A/D converter 212 starts at least one internal timer in audio sample controller 216. The internal timer is set to run for a predetermined period of time which is greater than the amount of time need to store the next video signals for the next image into first or second frame stores 206 or 208. In this particular embodiment, three-and-a-half seconds is needed to load the next image, so the internal timer is set for five seconds, although other periods of time could be used. Audio sample controller 216 monitors both the audio being output and the timer. If there is no audio with the image being displayed or the audio signals stop before the internal timer expires, then audio sample controller 216 does not signal a switch until the internal timer expires. If audio sample controller 216 detects audio signals past the expiration of the internal timer, then audio sample controller 216 will not signal a switch until the audio signals stop. When audio sample controller 216 determines that a switch should be made, audio sample controller 216 signals CD reader controller 202 and video switch 210. (Step 246).

Figure 10B:
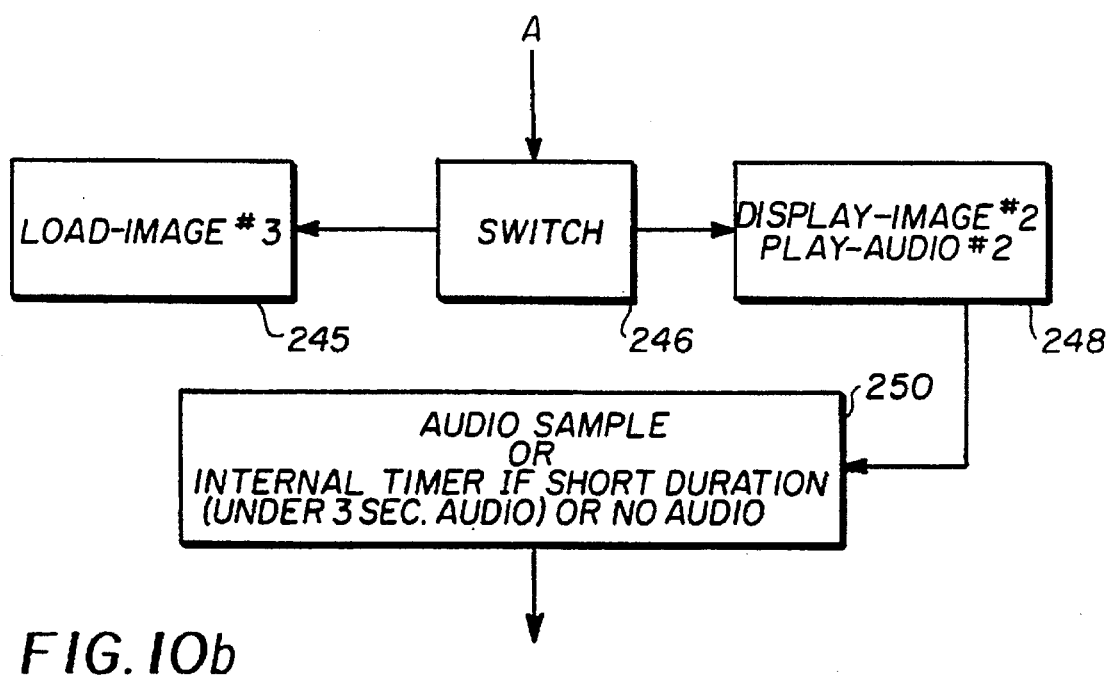
FIG. 10(b) is a continuation of the flow chart shown in FIG. 10(a).

Referring to FIGS. 9 and 10(b), when audio sample controller 216 signals a switch, then CD reader controller 202 signals first head 196 m CD reader 192 to read the next video signals on the photo compact disc and signals second head 198 to read the audio signals associated with the displayed video signals. (Step 248). CD reader controller 202 also signals CD reader switch 204 to connect first frame store 206 to first video output 218 to store the next video image and to connect second audio output 224 to audio D/A converter 212. Audio sample controller 216 also signals video switch 210 to switch the connection from first frame store 206 to video D/A converter 214 to second frame store 208. The second video image in second frame store 208 is transmitted to video D/A converter 214. Video D/A converters 214 converts the digital second video signal to an analog second video signal and audio D/A converter 212 converts the digital second audio signal being output from second audio output 224 of CD reader 192 to an analog second audio signal. The analog second video and audio signals are output through the display video and audio outputs 226 and 228, respectively.

The second audio signals are also sent to audio sample controller 216 from audio D/A converter 212 starting the internal timer in audio sample controller 216. Audio sample controller 216 monitors the second audio signals and the internal timer. If there are no second audio signals or the second audio signals expire before the internal timer then audio sample controller 216 signals a switch after the internal timer expires. This provides sufficient time for the video signals for the next image, to be stored in first frame store 206 and be ready for display immediately. If the second audio signals continue after the internal timer expires, then audio sample controller 216 signals a switch when the second audio signals stop. When audio sample controller 216 determines that a switch should be made, audio sample controller 216 signals first/second controller 202 and video switch 210. (Step 250).

The process continues as described above until on/off switch 200 or play switch 201 is turned off or CD reader 192 is programmed not to read any more tracks off of the compact discs. First and second heads 196 and 198 can read tracks off of the compact disc in any order desired. As the above description of the operation of the system 190 illustrates, the system 190 is able to switch the between video images without a noticeable transitional delay.

The invention has been described with reference to a preferred embodiment. However, it will be appreciated that variations and modifications can be effected by a person of ordinary skill in the art without departing from the scope of the invention. For example, some or all of the operations performed separately in the first and second master controller, first and second timer generator, first and second mute generator, first and second picture controller, and/or first and second next/pause generator could be combined in an alternative design.

PARTS LIST 20 portfolio compact disc visual/audio system
22 first photo compact disc player
24 second photo compact disc player
26 control device
28 first master controller
30 second master controller
32 first timer generator
34 second timer generator
36 first mute generator
38 second mute generator
40 first next/pause generator
42 second next/pause generator
44 first picture controller
46 second picture controller
48 video switcher
50 audio switcher
52 start button
54 line
56 line
58 line
59 line
60 line
61 switch
62 line
63 flip-flop
64 line
65 switch
66 line
67 line
68 line
69 switch
70 line
71 switch
72 line
74 line
76 line
78 line
79 line
80 line
81 buffer
82 line
84 line
86 line
88 line
90 line
92 line
94 line
96 line
98 line
100 line
102 line
104 line
106 line
108 line
110 line
112 line
114 line
116 line
118 SR-latch
120 OR gate
122 buffer
124 flip-flop
126 buffer
128 buffer
129 buffer
130 flip-flop
132 flip-flop
133 flip-flop
134 D-flip-flop
136 buffer
138 flip-flop
140 OR gate
142 flip-flop
144 flip-flop
146 flip-flop
148 buffer
150 flip-flop
152 D-flip-flop
154 flip-flop
156 flip-flop
158 AND gate
160 flip-flop
162 flip-flop
164 invertor
166 flip-flop
168 D-flip-flop
170 invertor
172 D-flop-flop
174 flip-flop
176 flip-flop
178 mute-during-timer circuit
180 mute-after-timer circuit
182 OR gate
184 flip-flop
186 flip-flop
188 flip-flop
190 compact disc visual/audio system
192 compact disc reader
194 control device
196 first head
198 second head
200 on/off switch
202 first/second controller 204 first/second switch
206 first frame store
208 second frame store
210 video switch
212 audio digital-to-analog converter
214 video D/A converter
216 audio sample controller
218 first video output
220 first audio output
222 second video output
224 second audio output
226 display video output
228 display audio output
230 step
232 step
234 step
236 step
238 step
240 step
242 step
244 step
246 step
248 step
250 step

What is claimed is:

1. An apparatus for outputting images and any associated audio stored on a photo compact disc, the apparatus comprising:

a compact disc reader for reading the photo compact disc, the reader having a first video-output and a first audio-output representative of one image and any associated audio stored on the photo compact disc and having a second video-output and a second audio-output representative of another image and any associated audio stored on the photo compact disc; and a control device having a video-for-display output and an audio-for-display output, the control device further comprising an audio-sample controller and a CD reader switch, the audio-sample controller coupled to the CD reader switch, the audio-for-display output and the CD reader switch, the CD reader switch coupled between the first video-output, the second video output, the first audio-output, and the second audio-output and the video-for-display output and the audio-for-display output, the audio-sample controller controlling the CD reader switch to selectively change the video-for-display output between the images from the first video-output and the second video output in response to the audio on the audio-for-display output.

2. The apparatus of claim 1 wherein the control device further comprises a first timer and said control device controls said CD reader switch to selectively change the video-for-display output between the images from the first video-output and the second video-output in response to the audio on the audio-for-display output and the first timer.

3. The apparatus of claim 2 wherein the first timer has a duration longer than the time needed to change between two images without a perceptible transitional delay, the audio-sample controller controlling the CD reader switch to change the first video-output or the second video-output coupled to the video-for-display output after the later of the expiration of the first timer or the detection of no audio on the audio-for-display output.

4. The apparatus of claim 3 wherein the first timer has a duration of at least three-and-a-half seconds.

5. The apparatus of claim 1 wherein the control device further comprises:

a video switch coupled to the video-for-display output, the audio-sample controller coupled to the video switch;

a first-frame store coupled between the CD reader switch and the video switch; and a second-frame store coupled between the CD reader switch and the video switch;

the audio-sample controller controlling the CD reader switch to connect either the first video-output to the first-frame store and the second audio-output to the audio-for display output or the second video-output to the second-frame store and the first audio-output to the audio for display output in response to the audio on the audio-for display output;

the audio-sample controller also controlling the video switch to connect the first-frame store or the second-frame store which is not connected by the CD reader switch to the first video-output or the second video-output to the video-for-display output in response to the audio on the audio-for display output.

6. The apparatus of claim 5 further comprising a CD reader controller coupled between the audio sample controller and the compact disc reader, the CD reader controller controlling the reader to read out an image from the compact disc to be stored in the first or second video frame store coupled to the reader by the CD reader switch while controlling the reader to read the audio associated with the image stored in the first or second frame store coupled to the video-for-display output by the video switch in response to a control signal from the audio-sample controller.

7. The apparatus of claim 6 wherein the audio sample controller includes a first timer and the audio sample controller controls the CD reader controller, the video switch, and the CD reader switch in response to the first timer and to the audio on the audio-for-display output.

8. The apparatus of claim 7 wherein the first timer has a duration longer than the time needed to change an image without a perceptible transitional delay, the audio sample controller triggers the CD reader controller to change the CD reader switch to switch the connection after the later of the expiration of the first timer or the detection of no audio from the audio-for-display output.

9. The apparatus of claim 8 wherein the first timer has a duration of at least three-and-a-half seconds.

10. A method for outputting images and any associated audio stored on a photo compact disc, a reader reading the compact disc and outputting a first video-output and a first audio-output representative of one image and any associated audio from the photo compact disc and having a second video-output and a second audio-output representative of another image and any associated audio from the photo compact disc and a control device having a video-for-display output and an audio-for-display output, the control device further comprising an audio-sample controller and a CD reader switch, the audio-sample controller coupled to the CD reader switch, the audio-for display output and the CD reader switch, the CD reader switch coupled between the first video-output, the second video output, the first audio-output, and the second audio-output and the video-for-display output and the audio-for display output, the method comprising the steps of:

monitoring the audio on the audio-for-display output with the audio-sample controller; and controlling the CD reader switch in response to the audio to connect the video-for-display output to change between the images from the first video-output and the second video-output in response to the audio on the audio-for-display output.

11. The method of claim 10 further comprising the steps of:

monitoring a first timer in the control device; and controlling the CD reader switch in response to the audio on the audio-for-display output and to the first timer.

12. The method of claim 11 wherein the first timer has a duration longer than the time needed to change an image without a perceptible transitional delay, the control device controlling the CD reader switch to change the first video-output or the second video-output coupled to the video-for-display output after the later of the expiration of the first timer or the detection of no audio from the audio-for-display output.

13. The method of claim 12 wherein the first timer has a duration of at least three-and-a-half seconds.

* * * * *